US011040811B2

(12) United States Patent
Toft et al.

(10) Patent No.: US 11,040,811 B2
(45) Date of Patent: Jun. 22, 2021

(54) LAMINATED PACKAGING MATERIAL, PACKAGING CONTAINERS MANUFACTURED THEREFROM AND A METHOD FOR MANUFACTURING THE LAMINATE MATERIAL

(71) Applicant: TETRA LAVAL HOLDINGS & FINANCE S.A., Pully (CH)

(72) Inventors: Nils Toft, Lund (SE); Cristian Neagu, Epalinges (CH); Ulf Nyman, Eslöv (SE); Katarina Jonasson, Bjärred (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 243 days.

(21) Appl. No.: 15/779,285

(22) PCT Filed: Nov. 25, 2016

(86) PCT No.: PCT/EP2016/078751
§ 371 (c)(1),
(2) Date: May 25, 2018

(87) PCT Pub. No.: WO2017/089504
PCT Pub. Date: Jun. 1, 2017

(65) Prior Publication Data
US 2018/0319559 A1 Nov. 8, 2018

(30) Foreign Application Priority Data
Nov. 27, 2015 (EP) ..................... 15196869

(51) Int. Cl.
*B65D 65/40* (2006.01)
*B65D 85/72* (2006.01)
(Continued)

(52) U.S. Cl.
CPC .............. *B65D 65/40* (2013.01); *B32B 15/08* (2013.01); *B32B 15/088* (2013.01); *B32B 15/12* (2013.01);
(Continued)

(58) Field of Classification Search
CPC . B32B 15/12; B32B 2255/12; B32B 2255/26; B32B 2255/28; B32B 27/06;
(Continued)

(56) References Cited

U.S. PATENT DOCUMENTS

| 6,119,928 A | 9/2000 | Lasson et al. |
| 6,872,459 B1 * | 3/2005 | Frisk ...................... B32B 27/08 428/474.4 |

(Continued)

FOREIGN PATENT DOCUMENTS

| CA | 1331954 C | * 9/1994 | ............. B32B 27/32 |
| CN | 101563504 A | 10/2009 | |

(Continued)

OTHER PUBLICATIONS

The board and carton glossary published online at https://techlabsystems.com/en/datasheets/technical%20articles-glossary/Carton%20and%20Board%20GLOSSARY.pdf on Jun. 2008 by TLS Techlab Systems ("TLS") (Year: 2008).*

(Continued)

*Primary Examiner* — Lee E Sanderson
(74) *Attorney, Agent, or Firm* — Buchanan Ingersoll & Rooney PC

(57) ABSTRACT

The present invention relates to a laminated cellulose-based liquid or semi-liquid food packaging material, comprising a bulk layer from cellulose fluting material, an outside substrate layer having a print surface and on the inside an aluminium foil barrier and a further barrier layer. The invention further relates to the method for manufacturing the (Continued)

Figure 1A:
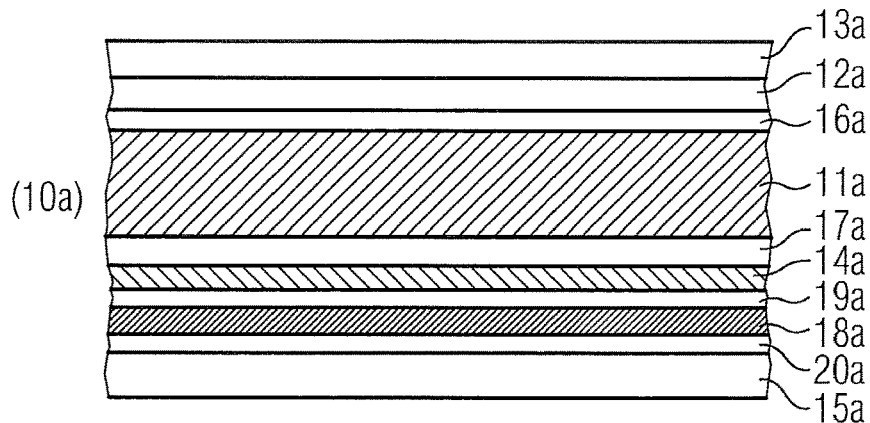

laminated packaging material and to a packaging container for liquid food packaging, comprising the laminated packaging material.

14 Claims, 6 Drawing Sheets

(51) Int. Cl.
| | |
|---|---|
| B32B 15/088 | (2006.01) |
| B32B 15/12 | (2006.01) |
| B32B 27/08 | (2006.01) |
| B32B 27/10 | (2006.01) |
| B32B 27/30 | (2006.01) |
| B32B 27/36 | (2006.01) |
| B32B 29/00 | (2006.01) |
| B32B 29/08 | (2006.01) |
| B32B 27/32 | (2006.01) |
| B32B 15/08 | (2006.01) |
| B65D 75/40 | (2006.01) |
| B32B 27/34 | (2006.01) |
| B65D 75/48 | (2006.01) |

(52) U.S. Cl.
CPC ............ *B32B 27/08* (2013.01); *B32B 27/10* (2013.01); *B32B 27/306* (2013.01); *B32B 27/32* (2013.01); *B32B 27/34* (2013.01); *B32B 27/36* (2013.01); *B32B 29/005* (2013.01); *B32B 29/08* (2013.01); *B65D 75/40* (2013.01); *B65D 75/48* (2013.01); *B65D 85/72* (2013.01); *B32B 2270/00* (2013.01); *B32B 2307/31* (2013.01); *B32B 2307/412* (2013.01); *B32B 2307/7244* (2013.01); *B32B 2307/7265* (2013.01); *B32B 2307/75* (2013.01); *B32B 2439/62* (2013.01); *B32B 2439/70* (2013.01)

(58) Field of Classification Search
CPC ....... B32B 27/08; B32B 27/10; B32B 29/005; B32B 2307/718; B32B 2439/40; B32B 2439/62; B32B 2439/70; B32B 2317/12; B65D 75/44; B65D 75/48; Y10T 428/31895; Y10T 428/1303; Y10T 428/1359; D21H 23/68
USPC ......................... 428/34.2, 34.3, 35.6, 478.4
See application file for complete search history.

(56) References Cited

U.S. PATENT DOCUMENTS

| | | | |
|---|---|---|---|
| 10,328,666 B2 | 6/2019 | Nyman et al. | |
| 2005/0008800 A1 | 1/2005 | Andersson et al. | |
| 2007/0298196 A1* | 12/2007 | Petersen | B32B 27/10 428/34.2 |
| 2010/0024998 A1 | 2/2010 | Wildlock et al. | |
| 2013/0192166 A1* | 8/2013 | Olsson | B32B 27/10 53/428 |
| 2014/0305997 A1 | 10/2014 | Olsson et al. | |
| 2018/0304607 A1 | 10/2018 | Öhman et al. | |
| 2018/0305098 A1 | 10/2018 | Nyman et al. | |
| 2018/0311940 A1 | 11/2018 | Toft et al. | |
| 2018/0354690 A1 | 12/2018 | Collaud et al. | |
| 2019/0202191 A1 | 7/2019 | Toft et al. | |

FOREIGN PATENT DOCUMENTS

| | | | | |
|---|---|---|---|---|
| CN | 102470649 A | 5/2012 | | |
| EP | 0 341 937 A2 | 11/1989 | | |
| EP | 0 621 202 A1 | 10/1994 | | |
| EP | 2 949 597 A1 | 12/2015 | | |
| EP | 3026173 A1 * | 6/2016 | ........... | B65D 81/386 |
| JP | H07-009628 A | 1/1995 | | |
| JP | 2010-513741 A | 4/2010 | | |
| JP | 2015-503468 A | 2/2015 | | |
| WO | WO 99/39988 A1 | 8/1999 | | |
| WO | WO 03/035503 A1 | 5/2003 | | |
| WO | WO 2006/059938 A1 | 6/2006 | | |
| WO | WO 2011/003566 A1 | 1/2011 | | |
| WO | WO-2011003566 A1 * | 1/2011 | ............... | B32B 5/18 |
| WO | WO 2013/098025 A1 | 7/2013 | | |
| WO | WO 2015/036932 A1 | 3/2015 | | |

OTHER PUBLICATIONS

U.S. Appl. No. 15/779,323, filed May 25, 2018 entitled "Packaging Material and Packaging Container," published as U.S. Application Publication No. US 2018/0305098.
U.S. Appl. No. 15/779,358, filed May 25, 2018 entitled "Laminated Packaging Material, Packaging Containers Manufactured Therefrom," published as U.S. Application Publication No. US 2018/0311940.
U.S. Appl. No. 15/779,205, filed May 25, 2018 entitled "Method of Manufacturing a Laminated Packaging Material, The Packaging Material Obtained by the Method and Packaging Containers Manufactured Therefrom," published as U.S. Application Publication No. US 2019/0202191.
U.S. Appl. No. 15/780,329, filed May 31, 2018 entitled "Laminated Packaging Material, Packaging Containers Manufactured Therefrom and a Method for Manufacturing the Laminate Material," published as U.S. Application Publication No. US 2018/0354690.
U.S. Appl. No. 15/779,336, filed May 25, 2018 entitled "Method for Manufacturing a Laminated Packaging Material, The Laminated Packaging Material and Packaging Containers Made Therefrom," published as U.S. Application Publication No. US 2018/0304607.
International Search Report (PCT/ISA/210) dated Feb. 2, 2017, by the European Patent Office as the International Searching Authority for International Application No. PCT/EP2016/078751.
Written Opinion (PCT/ISA/237) dated Feb. 2, 2017, by the European Patent Office as the International Searching Authority for International Application No. PCT/EP2016/078751.
Search Report dated Feb. 26, 2020, by the Russian Patent Office in corresponding Russian Patent Application No. 2018123163/05(036702). (2 pages).
Office Action (Notice of Reasons for Refusal) dated Oct. 5, 2020, by the Japanese Patent Office in corresponding Japanese Patent Application No. 2018-527130 and an English Translation of the Office Action. (8 pages).

* cited by examiner

LAMINATED PACKAGING MATERIAL, PACKAGING CONTAINERS MANUFACTURED THEREFROM AND A METHOD FOR MANUFACTURING THE LAMINATE MATERIAL

TECHNICAL FIELD

The present invention relates to a new liquid packaging laminated packaging material having an aluminium foil barrier layer and to a method for manufacturing the laminated packaging material.

Furthermore, the invention relates to packaging containers comprising the laminated packaging material or being made of the laminated packaging material.

BACKGROUND

Packaging containers of the single use disposable type for liquid foods are often produced from a packaging laminate based on paperboard or carton. One such commonly occurring packaging container is marketed under the trademark Tetra Brik Aseptic® and is principally employed for aseptic packaging of liquid foods such as milk, fruit juices etc, sold for long term ambient storage. The packaging material in this known packaging container is typically a laminate comprising a bulk layer of paper or paperboard and outer, liquid-tight layers of thermoplastics. In order to render the packaging container gas-tight, in particular oxygen gas-tight, for example for the purpose of aseptic packaging and packaging of milk or fruit juice, the laminate in these packaging containers normally comprises at least one additional layer, most commonly an aluminium foil.

On the inside of the laminate, i.e. the side intended to face the filled food contents of a container produced from the laminate, there is an innermost layer, applied onto the aluminium foil, which innermost, inside layer may be composed of one or several part layers, comprising heat sealable thermoplastic polymers, such as adhesive polymers and/or polyolefins. Also on the outside of the bulk layer, there is an outermost heat sealable polymer layer.

The packaging containers are generally produced by means of modern, high-speed packaging machines of the type that form, fill and seal packages from a web or from prefabricated blanks of packaging material. Packaging containers may thus be produced by reforming a web of the laminated packaging material into a tube by both of the longitudinal edges of the web being united to each other in an overlap joint by welding together the inner- and outermost heat sealable thermoplastic polymer layers. The tube is filled with the intended liquid food product and is thereafter divided into individual packages by repeated transversal seals of the tube at a predetermined distance from each other below the level of the contents in the tube. The packages are separated from the tube by incisions along the transversal seals and are given the desired geometric configuration, normally parallelepipedic or cuboid, by fold formation along prepared crease lines in the packaging material.

The main advantage of this continuous tube-forming, filling and sealing packaging method concept is that the web may be sterilised continuously just before tube-forming, thus providing for the possibility of an aseptic packaging method, i.e. a method wherein the liquid content to be filled as well as the packaging material itself are reduced from bacteria and the filled packaging container is produced under clean conditions such that the filled package may be stored for a long time even at ambient temperature, without the risk of growth of micro-organisms in the filled product. Another important advantage of the Tetra Brik®-type packaging method is, as stated above, the possibility of continuous high-speed packaging, which has considerable impact on cost efficiency.

Packaging containers for sensitive liquid food, for example milk or juice, can also be produced from sheet-like blanks or prefabricated blanks of the laminated packaging material of the invention. From a tubular blank of the packaging laminate that is folded flat, packages are produced by first of all building the blank up to form an open tubular container capsule, of which one open end is closed off by means of folding and heat-sealing of integral end panels. The thus closed container capsule is filled with the food product in question, e.g. juice, through its open end, which is thereafter closed off by means of further folding and heat-sealing of corresponding integral end panels. An example of a packaging container produced from sheet-like and tubular blanks is the conventional so-called gable-top package. There are also packages of this type which have a moulded top and/or screw cap made of plastic.

The layer of an aluminium foil in the packaging laminate provides gas barrier properties quite superior to most polymeric gas barrier materials. The conventional aluminium-foil based packaging laminate for liquid food aseptic packaging is still the most cost-efficient packaging material, at its level of performance, available on the market today.

Any other material to compete with such foil-based materials must be cost-efficient regarding raw materials, have comparable food preserving properties, be sufficiently mechanically stable and have a comparably low complexity in the conversion into a finished packaging laminate.

Decreasing the costs of today's packaging material further, can be made by down-gauging the thickness of the polymer layers or by seeking to replace the aluminium foil barrier by one or more different barrier layers, which has proven to be quite a challenge. A way of saving costs, which has hitherto not been seen as practical in the field of liquid carton packaging, would be by down-gauging the cellulose-based bulk layer by type and/or amount of cellulose fibre material. It normally leads to the important properties of mechanical strength and packaging integrity, as well as material barrier properties, being jeopardized and has previously been considered as a less favourable way forward. The paperboard is a major part of liquid carton packaging material, however also representing a major part of the total packaging material costs.

SUMMARY

It is now, considering the above, an object of the present invention to realise a new way of reducing costs of laminated cellulose-based liquid- or semi-liquid food packaging materials.

It is also a general object of the invention to provide a more cost-efficient laminated cellulose-based packaging material having sufficient mechanical stability as well as good, or even improved, barrier and integrity properties, which fulfil the needs in liquid carton laminated packaging materials.

It is a further object of the invention to provide a low-cost such laminated packaging material having a reduced content of materials not based on biodegradable and renewable materials, i.e. less of materials from sources exploiting fossile raw materials.

A yet further object, is to provide a laminated cellulose-based packaging material based on a down-gauged bulk or core layer, which has inadequate mechanical performance for liquid packaging material as it is currently designed and produced, the final packaging material still having comparable mechanical strength and barrier properties to conventional such packaging laminates.

A further object, is to enable cost-efficient differentiation of the outside layers of a laminated packaging material, i.e. the layers which will attract and appeal to consumers, on the outside of a packaging container. Such outside layers may according to the method of the invention easily be swapped, such that different decorative and/or tactile features may be laminated into the material, according to different desires among dairy and filler customers, consumers and retailers. Such customization makes it possible to produce separate, shorter series of differently decorated and tailor-made packaging materials, without creating stoppages, waste and logistics problems in the main stream of the material manufacturing line.

Some or all of these objects are thus attainable according to the present invention by the laminated packaging material, the method of manufacturing the laminated packaging material as well as the packaging container made therefrom, as defined in the appended claims.

DETAILED DESCRIPTION

With the term "long-term storage" in connection with the present invention, is meant that the packaging container should be able to preserve the qualities of the packed food product, i.e. nutritional value, hygienic safety and taste, at ambient conditions for at least 1 or 2 months, such as at least 3 months, preferably longer, such as 6 months, such as 12 months, or more.

With the term "package integrity", is generally meant the package durability, i.e. the resistance to leakage or breakage of a packaging container. A main contribution to this property is that within a packaging laminate there is provided good internal adhesion between adjacent layers of the laminated packaging material. Another contribution comes from the material resistance to defects, such as pinholes, ruptures and the like within the material layers, and yet another contribution comes from the strength of the sealing joints, by which the material is sealed together at the formation of a packaging container. Regarding the laminated packaging material itself, the integrity property is thus mainly focused on the adhesion of the respective laminate layers to its adjacent layers, as well as the quality of the individual material layers.

The term "liquid or semi-liquid food" generally refers to food products having a flowing content that optionally may contain pieces of food. Dairy and milk, soy, rice, grains and seed drinks, juice, nectar, still drinks, energy drinks, sport drinks, coffee or tea drinks, coconut water, tea drinks, wine, soups, jalapenos, tomatoes, sauce (such as pasta sauce), beans and olive oil are some non-limiting example of food products contemplated.

The term "aseptic" in connection with a packaging material and packaging container refers to conditions where microorganisms are eliminated, in-activated or killed. Examples of microorganisms are bacteria and spores. Generally an aseptic process is used when a product is aseptically packed in a packaging container.

With the term "bulk layer" is normally meant the thickest layer or the layer containing the most material in a multi-layer laminate, i.e. the layer which is contributing most to the mechanical properties and the dimensional stability of the laminate and of packaging containers folded from the laminate. In the context of the present invention, it may also mean a layer providing a greater thickness distance in a sandwich structure, which further interacts with stabilizing facing layers, which have a higher Young's modulus, on each side of the bulk layer, in order to achieve sufficient such mechanical properties and dimensional stability.

A "spacer layer" is a layer that creates a distance or space between significantly thinner material layers, which have a higher Young's modulus and density, such as a high-density and high tensile stiffness paper layer or foil or film arranged on a side of the spacer layer, i.e. a stiffness- and stability-providing layer, so-called facing layer. The spacer layer has a lower or reduced inherent bending stiffness and thus does not itself contribute much directly to the bending stiffness of a laminated packaging material. Indirectly, it contributes very much, however, by the interaction with adjacent or laminated layers on both sides, some of the layers having a higher Young's modulus but a lower thickness in comparison to the spacer layer. In a sandwich construction, it is important that there is at least one such facing layer, or stiffness-enhancing layer on each side of the spacer layer. When the spacer layer has very low density and is not contributing itself by any bending stiffness property, one facing layer on each side of the spacer layer is needed. When the distance between the paper facing layers is increased, also the flexural strength and bending stiffness of the laminated sandwich structure will be increased.

A "bulk layer" may comprise a "spacer layer" and a further combined or integrated layer within the bulk, but may also be the same as a "spacer layer". The term "heat-sealing" refers to the process of welding one surface of a thermoplastic material to another thermoplastic surface. A heat-sealable material should, under the appropriate conditions such as applying sufficient heating and pressure, be able to generate a seal when pressed against and in contact with another suitable thermoplastic material. Suitable heating can be achieved by induction heating or ultrasonic heating or other conventional contact or convection heating means, e.g. hot air.

According to a first aspect of the invention, there is provided a laminated cellulose-based, liquid- or viscous-food packaging material, for heat sealing into aseptic packaging containers, comprising a bulk material layer comprising cellulose-based containerboard material, including fluting material and linerboard material, having a short compression test index value (SCT index), i.e. SCT normalized per grammage, of at least 30 Nm/g in the machine direction (MD), as measured according to ISO 9895 and ISO 536, a separate print substrate layer arranged on the outside of the bulk layer, i.e. on the side to be directed outwards from a packaging container made from the laminated material, and an outermost, transparent, protective polymer layer on the outside of the print substrate layer, the laminated packaging material further comprising an innermost, heat sealable and liquid-tight layer of a thermoplastic polymer, the innermost polymer layer intended to be in direct contact with the packaged food product, a layer of a barrier metal foil or a barrier-coated film, laminated between the bulk layer and the innermost layer and a further barrier layer comprising at least 50 wt-% up to 100 wt % of a polyamide, also arranged between the bulk layer and the innermost heat sealable layer.

By removing the decorative function of today's bulk layer, i.e. the white printable surface onto which a colour décor pattern may be printed as well as at least some of its bending stiffness, from the bulk layer, and instead laminating a low quality bulk layer to a separate print substrate layer on the outside of the bulk layer, greater flexibility in the manufacturing process of differently appearing packaging laminates may be provided at a lower cost and at a shorter lead time from order to delivery. Accordingly, it becomes easier to change the outer appearance of packaging containers, without affecting the manufacturing process or the raw materials other than by merely exchanging the print substrate and the actual printed décor pattern. A print substrate layer may be white, brown, coloured, metallised etc. At the same time, mechanically and dimensionally stable packaging containers with a good appearance will still be obtained, thanks to the sandwich effect of the layers of the laminate as a whole.

Laminated between the bulk layer and the innermost heat sealable and liquid tight layer, there is thus a barrier metal foil or a barrier-coated polymer film. One preferred barrier metal foil is aluminium foil. Alternatively, a polymer film substrate having a barrier coating, such as a dispersion-coated or liquid-film coated barrier coating, or a vapour deposited barrier coating may be laminated there between. Such barrier foils and films have the common drawback that the actual barrier material is either a relatively brittle or stress-sensitive material with relatively low ability to stretch, or is applied at a very thin, and therefore sensitive, coating thickness, or both. Their sensitivity to mechanical stress is not normally reduced by being applied as thicker layers either, but rather the contrary. During the conversion of a laminated packaging material into a packaging container, there are several operations that will apply mechanical strain to the material layers, such as the creasing of the material, the bending and folding of the material, as well as the sealing of it into folded and shaped packages. Although these stress sensitive barrier materials and coatings inherently have very efficient barrier properties, they need to be well balanced into laminated packaging materials in order to endure the necessary mechanical stresses.

When the balance of properties between layers in a laminated packaging material is skewed, by a change from a standard, conventional laminated layer structure, there is a need to compensate for the loss of some properties. It has been learned that a good way of buffering the effects of such changes is to add a layer of an oxygen barrier polymer, such as polyamide, in order to compensate, heal and hide any problems that may appear by the change. Polyamide has good thermoplastic properties to be suitable as a laminate layer generally, provides good interfaces to adjacent layers and also provides generally some barrier properties towards gases, such as oxygen and other slowly migrating compounds such as free fatty acids. Polyamide is not generally a good enough stand-alone barrier material, but in the context of using it as a buffering, compensating layer, it only has to be applied in low amounts, such as below 10 g/m$^2$.

The further barrier layer comprising at least 50 wt-% of a polyamide may be arranged between the barrier metal foil or barrier-coated film and the innermost heat sealable layer. At this layer location, the polyamide barrier layer may be active as both additional oxygen barrier and as a barrier towards free fatty acids migrating from the filled food product into and outwards through the packaging material.

In particular, when a polyamide is added on the inner side of a metal barrier layer, this prevents free fatty acids from the packed food product to migrate from the food to the metal barrier layer, and thus the barrier properties of the barrier layer(s) may be kept intact and the adhesion of the inside heat sealed polymer layers to the barrier metal foil or barrier-coated film may be maintained for a longer shelf-life time.

The further barrier layer may comprise a polyamide in a blend with an ethylene vinyl alcohol (EVOH). The EVOH material also contributes to the additional barrier properties in a similar way to the polyamide, but does not have the same advantageous processability properties in melt (co-) extrusion coating and lamination operations. Similar considerations apply to polyethylene therephthalate (PET) and a blend of a polyamide and a PET is useful as an alternative. The further barrier layer may thus comprise a polyamide at 50 weight % or higher, in a blend with a polyethyleneterephthalate (PET).

The polyamide may comprise an aromatic or semi-aromatic polyamide. Such polyamides may provide better barrier properties towards migrating free fatty acids, why such a combination is particularly advantageous for packaging of fruit juices and the like.

The further barrier layer may be applied at an amount from 3 to 12 g/m$^2$, such as from 3 to 10 g/m$^2$, such as from 3 to 8 g/m$^2$, such as from 3 to 6 g/m$^2$.

A suitable film substrate for barrier-coated films may be a polymer film selected from the group consisting of films based on polyesters, such as oriented or non-oriented polyethylene terephthalate (PET), oriented or non-oriented polyethylenefuranoate (PEF), oriented or non-oriented polybutylene terephthalate (PBT), polyethylene napthanate (PEN), polyamides, such as, non-oriented or oriented polyamide (PA, OPA, BOPA), ethylene vinyl alcohol copolymers (EVOH), polyolefins such as polypropylene, mono- or biaxially oriented polypropylene (PP, OPP, BOPP), polyethylenes such as oriented or non-oriented high density polyethylene (HDPE), linear low density polyethylene (LLDPE) and cyclo-olefin co-polymers (COC), and blends of any of said polymers, or a multilayer film having a surface layer comprising any of said polymers or blends thereof.

According to some embodiments, the barrier properties may be partly provided by a polymer layer or multilayer, or by a film from one or more barrier polymers, while in other embodiments the polymer of a film is only employed for the purpose of providing a substrate for a subsequently applied barrier coating.

Oxygen barrier properties may be provided by thin liquid film coatings, for example barrier polymers that are coated in the form of a dispersion or solution in a liquid medium or solvent, onto a substrate, such as a paper or polymer film substrate, and subsequently dried into thin barrier coatings. It is important that the dispersion or solution is homogeneous and stable, to result in an even coating with uniform barrier properties. Examples of suitable polymers for aqueous compositions are polyvinyl alcohols (PVOH), water-dispersible ethylene vinyl alcohols (EVOH) or polysaccharide-based water-dispersible or dissolvable polymers. Such dispersion coated or so called liquid film coated (LFC) layers may be made very thin, down to tenths of a gram per m$^2$, and may provide high quality, homogenous layers, provided that the dispersion or solution is homogeneous and stable, i.e. well prepared and mixed. PVOH has excellent oxygen barrier properties under dry conditions and also provides very good odour barrier properties, i.e. capability to prevent odour substances from entering the packaging container from the surrounding environment, e.g. in a fridge or a storage room, which capability becomes important at long-term storage of packages. Furthermore, such liquid film coated polymer layers from water-dispersible or -dissolvable polymers often provide good internal adhesion to adjacent layers, which contributes to good integrity of the final packaging container.

Suitably, the polymer is selected from the group consisting of vinyl alcohol-based polymers, such as PVOH or water dispersible EVOH, acrylic acid or methacrylic acid based polymers (PAA, PMAA), polysaccharides such as for example starch or starch derivatives, cellulose nanofibrils (CNF), nanocrystalline cellulose (NCC), chitosan, hemicellulose or other cellulose derivatives, water dispersible polyvinylidenechloride (PVDC) or water dispersible polyesters, or combinations of two or more thereof.

More preferably, the polymer binder is selected from the group consisting of PVOH, water dispersible EVOH, polysaccharides such as for example starch or starch derivatives, chitosan or other cellulose derivatives, or combinations of two or more thereof.

Such barrier polymers are thus suitably applied by means of a liquid film coating process, i.e. in the form of an aqueous or solvent-based dispersion or solution which, on application, is spread out to a thin, uniform layer on the substrate and thereafter dried.

Aqueous compositions generally have certain environmental advantages. Preferably, the liquid gas barrier composition is water-based, because such composition usually have a better work environment friendliness than solvent-based systems, as well.

Most preferably, the gas barrier polymer is PVOH, because it has all the good properties mentioned above, i.e. film formation properties, gas barrier properties, cost efficiency, food compatibility and odour barrier properties.

A PVOH-based gas barrier composition performs best when the PVOH has a degree of saponification of at least 98%, preferably at least 99%, although PVOH with lower degrees of saponification will also provide oxygen barrier properties.

The liquid composition may additionally comprise inorganic particles in order to further improve the oxygen gas barrier properties.

The polymer binder material may for example be mixed with an inorganic compound which is laminar in shape, or flake-formed. By the layered arrangement of the flake-shaped inorganic particles, an oxygen gas molecule has to migrate a longer way, via a tortuous path, through the oxygen barrier layer, than the normal straight path across a barrier layer.

The inorganic laminar compound is a so-called nanoparticle compound dispersed to an exfoliated state, i.e. the lamellae of the layered inorganic compound are separated from each other by means of a liquid medium. Thus the layered compound preferably may be swollen or cleaved by the polymer dispersion or solution, which at dispersion has penetrated the layered structure of the inorganic material. It may also be swollen by a solvent before added to the polymer solution or polymer dispersion. Thus, the inorganic laminar compound is dispersed to a delaminated state in the liquid gas barrier composition and in the dried barrier layer. There are many chemically suitable nano-clay minerals, but preferred nano-particles are those of montmorillonite, such as purified montmorillonite or sodium-exchanged montmorillonite (Na-MMT). The nano-sized inorganic laminar compound or clay mineral preferably has an aspect ratio of 50-5000 and a particle size of up to about 5 μm in the exfoliated state.

Suitable inorganic particles mainly consist of laminar bentonite particles having an aspect ratio of from 50 to 5000.

Preferably, the barrier layer includes from about 1 to about 40 weight %, more preferably from about 1 to about 30 weight % and most preferably from about 5 to about 20 weight %, of the inorganic laminar compound based on dry coating weight. If the amount is too low, the gas barrier properties of the coated and dried barrier layer will not be markedly improved compared to when no inorganic laminar compound is used. If the amount is too high, the liquid composition will become more difficult to apply as a coating and more difficult to handle in storage tanks and conduits of the applicator system. Preferably, the barrier layer includes from about 99 to about 60 weight %, more preferably from about 99 to about 70 weight % and most preferably from about 95 to about 80 weight % of the polymer based on the dry coating weight. An additive, such as a dispersion stabiliser or the like, may be included in the gas barrier composition, preferably in an amount of not more than about 1 weight % based on the dry coating. The total dry content of the composition is preferably from 5 to 15 weight-%, more preferably from 7 to 12 weight-%.

According to a different preferred embodiment, the inorganic particles mainly consist of laminar talcum particles having an aspect ratio of from 10 to 500. Preferably, the composition comprises an amount of from 10 to 50 weight-%, more preferably from 20 to 40 weight-% of the talcum particles, based on dry weight. Below 20 weight-%, there is no significant increase in gas barrier properties, while above 50 weight-%, the coated layer may be more brittle and breakable because there is less internal cohesion between the particles in the layer. The polymer binder seems to be in too low an amount to surround and disperse the particles and laminate them to each other within the layer. The total dry content of such a liquid barrier composition from PVOH and talcum particles may be between 5 and 25 weight-%.

Surprisingly good oxygen barrier properties may be achieved when there is made use of colloidal silica particles, exhibiting a particle size of 3-150 nm, preferably 4-100 nm and even more preferred 5-70 nm, which particles are preferably amorphous and spherical. The use of colloidal silica particles moreover has the advantage that the liquid barrier composition may be applied at a dry content of 15-40 weight %, preferably 20-35 weight % and even more preferred 24-31 weight %, whereby the demand on forcible drying is decreased.

Less preferred alternatives of inorganic particles according to the invention are particles of kaolin, mica, calcium carbonate etc.

The preferred polymer binder, also when employing inorganic particles for providing oxygen barrier properties, is PVOH, partly due to its advantageous properties mentioned above. In addition, PVOH is advantageous from a mixing point of view, i.e. it is generally easy to disperse or exfoliate inorganic particles in an aqueous solution of PVOH to form a stable mixture of PVOH and particles, thus enabling a good coated film with a homogeneous composition and morphology.

Preferably, according to the invention, the said oxygen gas barrier layer is applied at a total amount of from 0.1 to 5 $g/m^2$, preferably from 0.5 to 3.5 $g/m^2$, more preferably from 0.5 to 2 $g/m^2$, dry weight. Below 0.1 $g/m^2$, there will be no gas barrier properties achieved at all, while above 5 $g/m^2$, the coated layer will not bring cost-efficiency to the packaging laminate, due to high cost of barrier polymers in general and due to high energy cost for evaporating off the liquid. A recognisable level of oxygen barrier is achieved by PVOH at 0.5 $g/m^2$ and above, and a good balance between barrier properties and costs is achieved between 0.5 and 3.5 $g/m^2$.

According to a preferred embodiment of the invention, the oxygen gas barrier layer is applied in two consecutive steps with intermediate drying, as two part-layers. When applied as two part-layers, each layer is suitably applied in amounts from 0.1 to 2.5 g/m$^2$, preferably from 0.5 to 1 g/m$^2$, and allows a higher quality total layer from a lower amount of liquid gas barrier composition. More preferably, the two part-layers are applied at an amount of from 0.5 to 2 g/m$^2$ each, preferably from 0.5 to 1 g/m$^2$ each.

According to a different embodiment of the invention, barrier coatings may be applied by means of physical vapour deposition (PVD) or chemical vapour deposition (CVD) onto a substrate surface of a film material. The substrate material itself may contribute with some properties as well, but should above all have appropriate surface properties, suitable for receiving a vapour deposition coating, and should work efficiently in a vapour deposition process.

Thin vapour deposited layers are normally merely nanometer-thick, i.e. have a thickness in the order of magnitude of nanometers, for example of from 1 to 500 nm (50 to 5000 Å), preferably from 1 to 200 nm, more preferably from 1 to 100 nm and most preferably from 1 to 50 nm.

One common type of vapour deposition coating, often having some barrier properties, in particular water vapour barrier properties, is so called metallization layers, e.g. aluminium metal physical vapour deposition (PVD) coatings.

Such a vapour deposited layer, substantially consisting of aluminium metal may have a thickness of from 5 to 50 nm, which corresponds to less than 1% of the aluminium metal material present in an aluminium foil of conventional thickness for packaging, i.e. 6.3 μm. While vapour deposition metal coatings require significantly less metal material, they only provide a low level of oxygen barrier properties, at most, and need to be combined with a further gas barrier material in order to provide a final laminated material with sufficient barrier properties. On the other hand, it may complement a further gas barrier layer, which does not have water vapour barrier properties, but which is rather sensitive to moisture.

Other examples of vapour deposition coatings are aluminium oxide (AlOx) and silicon oxide (SiOx) coatings. Generally, such PVD-coatings are more brittle and less suitable for incorporation into packaging materials by lamination. Metallized layers as an exception do have suitable mechanical properties for lamination material despite being made by PVD, however generally providing a lower barrier to oxygen gas.

Other coatings which have been studied for laminated packaging materials may be applied by means of a plasma enhanced chemical vapour deposition method (PECVD), wherein a vapour of a compound is deposited onto the substrate under more or less oxidizing circumstances. Silicon oxide coatings (SiOx) may, for example, also be applied by a PECVD process, and may then obtain very good barrier properties under certain coating conditions and gas recipes. Unfortunately, SiOx coatings show bad adhesion properties when laminated by melt extrusion lamination to polyolefins and other adjacent polymer layers, and the laminated material is exposed to wet or highly humid packaging conditions. Special, expensive adhesives or adhesive polymers are needed to reach and maintain sufficient adhesion in a packaging laminate of the type intended for liquid carton packaging.

The vapour deposition coating may alternatively be an amorphous hydrogenated carbon barrier layer applied by a plasma enhanced chemical vapour deposition process, PECVD, a so-called diamond-like carbon (DLC). DLC defines a class of amorphous carbon material that displays some of the typical properties of diamond. Preferably, a hydrocarbon gas, such as e.g. acetylene or methane, is used as process gas in the plasma for producing the coating. As pointed out above, it has now been seen that such DLC coatings, provide good and sufficient adhesion to adjacent polymer or adhesive layers in a laminated packaging material under wet testing conditions. Particularly good adhesion compatibility with adjacent laminated polymer layers, i.e. polymer layers which are adherent to or coated onto the DLC barrier coating, has been seen with polyolefins and in particular polyethylene and polyethylene-based co-polymers.

Such a DLC barrier coating provides good barrier and integrity properties to liquid-filled packaging containers made from a packaging laminate comprising a barrier film having the barrier coating, by contributing with good mechanical properties, good barrier properties to various substances migrating through such laminated materials in either inward or outward direction from a filled package, as well as by resulting in excellent adhesion to adjacent polymer layers in a laminate. Accordingly, a barrier film from a substrate layer of a polyester or polyamide, having a DLC barrier coating can provide a packaging laminate and a packaging container with oxygen barrier properties as well as water vapour barrier properties, for long term ambient storage, such as for up to 2-6 months, such as for up to 12 months. In addition, the DLC barrier coating provides good barrier properties to various aroma and flavour substances present in the packed food product, to low-molecular substances possibly appearing in the adjacent layers of materials, and to odours and other gases than oxygen. Moreover, the DLC barrier coating, exhibits good mechanical properties, as coated on a polymer film substrate, when laminated into a carton-based packaging laminate, withstanding lamination and subsequent fold-forming of the packaging laminate and sealing it into filled packages.

DLC coatings further have the advantage of being easy recyclable, without leaving residues in the recycled content that contain elements or materials that are not naturally existing in nature and our surrounding environment.

The use of the above described adhesive polymers should not be necessary for sufficient bonding to in particular metallised layers or DLC barrier coatings of the invention. Metallization adhesion to polyethylene layers are good, and sufficient and adequate adhesion to polyolefin layers as adjacent layers have been concluded also regarding DLC, at a level of at least 200 N/m, such as at least 300 N/m. Adhesion measurements were performed at room temperature with a 180° degrees peel force test apparatus (Telemetric Instrument AB), 24 h after the LDPE lamination. Peeling was performed at the DLC/LDPE interface, the peel-arm being the barrier film. Distilled water droplets were added to the peeled interface during peeling to assess also the adhesion under wet conditions, i.e. the conditions when the laminated packaging material has been saturated with migrating moisture through the material layers, from the liquid stored in a packaging container made from the laminated material, and/or by storage in a wet or highly humid environment. The given adhesion value is given in N/m and is an average of 6 measurements.

A dry adhesion of more than 200 N/m thus ensures that the layers do not delaminate under normal package manufacturing conditions, e.g. when bending and fold-forming the laminated material. A wet adhesion of this same level ensures that the layers of the packaging laminate do not delaminate after filling and package formation, during transport, distribution and storage. The interior bonding polymer layer may be coated directly onto the polymer film substrate having a DLC barrier layer coated thereon, by using common techniques and machines, e.g. those used for the lamination of an aluminum foil, in particular hot lamination (extrusion) of the polymer layer from a molten polymer onto the DLC barrier coating. Also, using a pre-made polymer film and binding it directly to the barrier-coated carrier film by locally melting it, e.g. by applying heat with a hot cylinder or heated roller, is possible. From the above it is apparent that the DLC barrier film can be handled in a similar way to an aluminium foil barrier in the lamination and conversion methods into a laminated packaging material, i.e. by means of extrusion lamination and extrusion coating. The lamination equipment and methods do not require any modification, by for example adding specific adhesive polymers or binder/tie layers as may be required by other plasma coated materials. In addition, the new barrier film including the DLC barrier layer coated thereon can be made as thin as an aluminium foil without adversely affecting the barrier properties in the final food package.

The bulk material layer may have a grammage from 100 to 300 $g/m^2$, such as from 100 to 200 $g/m^2$.

The thermoplastic polymer of the innermost heat sealable layer may be a polyolefin, such as polyethylene.

Suitable thermoplastic polymers for outermost and innermost heat sealable liquid-tight layers in the laminated packaging material of the invention, are polyolefins such as polyethylene and polypropylene homo- or co-polymers, preferably polyethylenes and more preferably polyethylenes selected from the group consisting of low density polyethylene (LDPE), linear LDPE (LLDPE), single-site catalyst metallocene polyethylenes (m-LLDPE) and blends or copolymers thereof. According to a preferred embodiment, the outermost heat sealable and liquid-tight layer is an LDPE, while the innermost heat sealable, liquid-tight layer is a blend composition of m-LLDPE and LDPE for optimal lamination and heat sealing properties. The outer- and innermost thermoplastic polymers layers may be applied by (co-)extrusion coating of the molten polymer to a desired thickness. The outer- and/or innermost liquid-tight and heat sealable layers may alternatively be applied in the form of pre-manufactured, oriented or non-oriented films. According to another embodiment, the outermost heat-sealable, liquid-tight and protective thermoplastic polymer layer may be applied by means of an aqueous dispersion coating of a thermoplastic polymer, such as when only low thickness of such an outermost layer is desired, or when such a process is preferable for other reasons.

The same thermoplastic polyolefin-based materials, in particular polyethylenes, as listed above regarding the outermost and innermost layers, are also suitable in bonding layers interior of the laminated material, e.g. between the bulk or core layer, and the barrier metal foil or barrier-coated film.

According to a particular embodiment, the barrier metal foil or a barrier-coated film barrier is laminated to the bulk layer by a bonding adhesive of an acrylic-modified polyethylene copolymer, applied at an amount from 0.5 to 3 $g/m^2$, such as from 1-2 $g/m^2$, such as from 1-1.5 $g/m^2$, dry content. It has been seen that it works very well to laminate an aluminium barrier foil to the bulk layer of a containerboard material with just a very low amount of an aqueous adhesive composition at a dry content of 20 to 50 weight-%, such as from 30 to 50 weight %, which is allowed to be partly absorbed into the network of fibres of the bulk layer cellulose surface, such that only about 2 $g/m^2$ of the adhesive polymer is applied and laminating the surfaces together. Quite contrary to prior belief, an aluminium barrier foil does not need to be cushioned by a thicker melt extruded layer as adjacent lamination layer to the bulk layer.

Alternatively, it is of course also possible to laminate the aluminium foil to the bulk layer in the traditional way by melt extrusion laminating a layer of a thermoplastic polymer, such as a polyolefin, such as polyethylene, such as low density polyethylene (LDPE) as the interjacent bonding layer between the two surfaces to be laminated.

Other suitable adhesive polymers for the extrusion lamination of bonding layers interior of the laminated material, i.e. between an outer heat sealable layer and a metal barrier foil, or a barrier- or primer-coated substrate layer, or for bonding a barrier-coated film to the bulk layer in a mono- or multilayer such bonding laminate layer, are the so-called adhesive thermoplastic polymers, such as modified polyolefins, which are mostly based on LDPE or LLDPE copolymers or, graft co-polymers with functional-group containing monomer units, such as carboxylic or glycidyl functional groups, e.g. (meth)acrylic acid monomers or maleic anhydride (MAH) monomers, (i.e. ethylene acrylic acid copolymer (EAA) or ethylene methacrylic acid copolymer (EMAA)), ethylene-glycidyl(meth)acrylate copolymer (EG(M)A) or MAH-grafted polyethylene (MAH-g-PE). Another example of such modified polymers or adhesive polymers are so called ionomers or ionomer polymers. Preferably, the modified polyolefin is an ethylene acrylic acid copolymer (EAA) or an ethylene methacrylic acid copolymer (EMAA).

Corresponding modified polypropylene-based thermoplastic adhesives or bonding layers may also be useful, depending on the requirements of the finished packaging containers.

Such adhesive polymer layers or tie layers are thus normally applied together with the respective outer layer or further bulk-to-barrier bonding layers in a co-extrusion coating operation.

A suitable print substrate layer is a paper having a paper or metallization print background surface and a grammage from 20 to 100 $g/m^2$, such as from 20 to 80 $g/m^2$, such as from 30 to 70 $g/m^2$.

Such a print substrate may have a printable surface which is a clay-coated white paper surface, or a brown, natural paper surface or a metallised film or metallized paper surface.

The print substrate layer may alternatively be a polymer film having a desired colour or metallized print background surface.

One kind of a suitable print substrate may be a stabilizing stretched and pre-manufactured polymer film, which may be selected from the group consisting of films based on any of polyesters, such as oriented or non-oriented polyethylene terephthalate (PET), oriented or non-oriented polyethylene-furanoate (PEF), oriented or non-oriented polybutylene terephthalate (PBT), polyethylene napthanate (PEN), polyamides, such as, non-oriented or oriented polyamide (PA, OPA, BOPA), ethylene vinyl alcohol copolymers (EVOH), polyolefins such as polypropylene, mono- or biaxially oriented polypropylene (PP, OPP, BOPP), polyethylenes such as oriented or non-oriented high density polyethylene (HDPE), linear low density polyethylene (LLDPE) and cyclo-olefin co-polymers (COC), and blends of any of said polymers, or a multilayer film having a surface layer comprising any of said polymers or blends thereof.

In a second aspect of the invention, a liquid-, semi-liquid or viscous-food packaging container comprising the laminated packaging material of the invention is provided. The packaging container can be made from the laminated packaging material entirely, by fold-forming a sheet- or web-shaped blank into a cuboid or other fold-shaped package or merely into a pouch package. Alternatively, it may be used as a packaging material sleeve, to be combined with plastic bottle tops or the like.

The packaging containers of the invention have an improved, or at least equal, performance to containers from a similar packaging material based on a conventional liquid packaging paperboard, and at a substantially lower material cost. This was unexpected and surprising, in view of the traditional views on which of the material layers may be reduced or altered in order to save costs.

In a third aspect of the invention, a method for manufacturing the laminated cellulose-based, liquid- or viscous-food packaging material of the invention is provided, comprising the steps, in any order, of a) laminating a barrier metal foil or barrier-coated film to a bulk material layer comprising a cellulose-based containerboard material having an SCT index value of at least 30 Nm/g in the machine direction (MD), as measured according to ISO 9895 and ISO 536, b) applying a further barrier layer comprising at least 50 weight-% of polyamide on the other, non-laminated side of the barrier metal foil or a barrier-coated film, c) applying an innermost heat sealable thermoplastic polymer layer on the non-laminated (in)side of the further barrier layer comprising polyamide, d) applying further layers, including a print substrate layer, with or without a printed décor pattern, to the other, outer side of the bulk material layer.

Containerboard materials include both fluting materials and linerboard materials.

The barrier metal foil or a barrier-coated film may be laminated to the bulk material layer by applying an aqueous adhesive composition onto one of the surfaces to be laminated and allow absorption of the adhesive composition into the cellulose surface of the bulk layer, while pressing the layers to adhere to each other by letting them pass through at least one lamination roller nip, without any drying operation or step being performed.

When lamination is done by aqueous adhesive absorption lamination, i.e. a lamination method wherein only a very small amount of polymer adhesive is applied and binding the two surfaces to be laminated together, while the aqueous medium or solvent is absorbed into the cellulose fiber network of the laminated layer(s) and no further drying or heating is needed, there is a further advantageous effect. While less thermoplastic bonding material is needed, such as in melt extrusion lamination, the relative proportion of paper or cellulose-based material layers in the packaging material is increased. Furthermore, the barrier layers may be down-gauged, if there are efficient combinations of properties of the various material layers included in the laminated packaging material, such as barrier properties of the adhesive polymer.

In an alternative embodiment, the layers may be laminated by melt extrusion lamination, which howeverentails higher costs.

The further barrier layer may be melt co-extrusion coated together with the innermost heat sealable layer onto the aluminium foil barrier in one common step b-c). This is the most economical and rational way of applying the inside polymer layers, i.e. together in one co-extrusion operation. It is however possible to do in two steps, or to apply the inside heat sealable layer in the form of a pre-manufactured film by extrusion laminating it to the inside of the aluminium foil by melt co-extruding the further barrier polymer material with adjacent tie layers there between.

The thermoplastic polymer of the innermost heat sealable layer may be a polyolefin, such as polyethylene, such as a blend of metallocene-catalysed linear low density polyethylene (m-LLDPE) and low density polyethylene (LDPE). When the innermost polyolefin layer is applied directly onto the compact-surface barrier paper, it is seen that the barrier properties of the laminated material increases significantly.

The print substrate layer on the outside of the bulk material layer, may be a further paper having a density higher than 800 kg/m$^3$ and a grammage of 100 g/m$^2$ or lower, such as 80 g/m$^2$ or lower, such as 70 g/m$^2$ or lower, to function as a facing layer in a sandwich structure, interacting with the bulk material layer acting as a spacer layer, and the aluminium foil barrier on the opposite side, i.e. the inside, of the bulk material layer.

In a further embodiment, the method comprises the steps of a) providing a web of a center module bulk material comprising a cellulose spacer layer of a containerboard material, having a grammage from 100 to 300 g/m$^2$, and an SCT index value of at least 30 Nm/g in the machine direction (MD), as measured according to ISO 9895 and ISO 536, b) providing a web of an outside material module, comprising at least a print substrate layer with or without a décor printed or applied thereon, the outside material module being intended for that side of the bulk material, which is to be directed to the outside of a packaging container made from the laminated packaging material, c) laminating the outside of the web of the center module bulk material and the web of the outside material module to each other, d) adding the décor to the outside material module, e) creasing and optionally, punching or perforating the laminated outside material module and center module bulk material, f) providing a web of an inside material module, comprising at least an aluminium foil barrier, the inside material module being intended for that side of the bulk material, which is to be directed to the inside of a packaging container made from the laminated packaging material, g) laminating the web of the inside material module and the inside of the web of the bulk material to each other, h) applying an outermost, transparent and liquid-tight protective layer on the outside of the outside material module, i) applying an outermost thermoplastic, liquid-tight and heat sealable layer on the inside of the inside material module, j) thus obtaining a web of the laminated cellulose-based liquid- or viscous-food packaging material, for further winding onto a reel, wherein the bulk material layer constitutes the center spacer layer of a sandwich structure within the laminated packaging material, the sandwich structure having the aluminium foil arranged as a facing layer on the inside of the spacer layer and interacting with the print substrate paper facing layer arranged on the outside of the spacer layer, the paper facing layer and the aluminium foil barrier having significantly lower thickness but a higher Young's modulus than the spacer layer.

The method steps may take place in any order, although the order as listed above is considered favourable from a lamination set-up point-of-view. Alternatively, the inside and outside material modules, may be pre-made, i.e. pre-laminated, such that the low-density and relatively more sensitive center module with the bulk layer comprising or consisting of the spacer layer, will only need to endure two lamination operations.

In a particular embodiment, an outside paper facing layer should be first laminated to the bulk layer, in order to be pre-cut together when making a pre-cut hole, opening or slit in the thicker, bulky parts of the material, as is today done in the conventional bulk paperboard. Such a pre-cut hole or opening or slit will thus be encapsulated between laminate layers that are laminated in subsequent operations, including the inside layers and the barrier-metal foil or barrier-coated film.

An example of a spacer layer is made from so-called containerboard material, which normally has a quite high density but a lower inherent bending stiffness, as well as other differences in mechanical properties, compared to conventional liquid packaging paperboard, such that the dimensional and mechanical stability of packages made from a bulk layer of such a material would be deteriorated, as made by conventional manufacturing of a packaging laminate. In particular, it has a substantially lower bending stiffness itself compared to a laminated packaging material suitable for liquid packaging. Bending stiffness is not commonly measured on containerboard materials, since they were anyway intended for corrugated carton manufacturing, but it has been measured that such materials have a bending stiffness at least 30%, such at least 40% such at least 50% lower, than the bending stiffness of a liquid carton paperboard, of the type Triplex or Duplex paperboard, at a corresponding grammage when excluding the printable coating (clay-coat) grammage. It still contributes to the total mechanical properties and bending stiffness of a laminated packaging material, however, by also providing a distance layer in a sandwich construction between facing layers, which have a higher Young's modulus, and by having higher compression strength properties in the in-plane (x-y) of the layer, than conventional paperboard for liquid packaging. Generally, fluting materials have a higher bending stiffness per grammage than linerboard materials.

Containerboard is also known as corrugated case material (CCM), and the materials needed for a corrugated case material are a corrugated medium (or fluted medium) which is, in use, fluted (welled) and then arranged by glueing between two flat linerboards or liner mediums. Such a corrugated construction provides a high sandwich structure bending stiffness, due to the fluted intermediate layer, which is acting as a distance or spacer layer between the two, relatively thinner, liner layers. The two types of paper that make up containerboard are thus linerboard material, also commonly called Kraft liner or Test liner, and fluting (or corrugating medium) material. Since containerboard materials mainly are made out of natural unbleached cellulose fibres, they are generally brown or beige, although the shade may vary depending on the type of cellulose. There are, however, also white top linerboards, which have a white top layer on one surface and which are normally more expensive materials.

Liner board normally has a density lower than 850 kg/m3, such as lower than 835 kg/m3, is brown or beige and comprises mainly softwood fibres, such as spruce and pine fibres.

Fluting is thus a paper product normally used as corrugating medium in corrugated container-paperboards, having a density of from 600 to 750 kg/m$^3$, such as from 600 to 700 kg/m$^3$, normally around 650 kg/m$^3$. Fluting paper is brown or beige and contains mostly short fibres, and is, just like linerboard, generally a low-cost, low-quality paper, which is not in itself suitable for manufacturing of liquid carton packages. However, when used as a spacer layer in a sandwich structure, it may work well for the purpose of liquid carton packaging, and at a substantially lower price, if the paper grade is of an approved kind and combined in the right way with the right layers in such a packaging laminate. The fluting medium would, however, form a spacer layer, which is non-fluted, by being a lower-stiffness, lower-cost fibrous material that may provide sufficient distance in a sandwich construction for a laminated liquid carton packaging material. Fluted spacer layers, i.e. well-formed spacer layers, are not within the scope of the present invention. Corrugated carton materials would pose quite different technical implications and requirements to liquid carton laminated packaging materials, and will not be dealt with here.

The fibres generally used in the manufacture of linerboard or fluting mediums may be recycled fibres and new, i.e. virgin fibres. The properties of paper are dependent on the structural characteristics of the various fibres that compose the sheet. Generally, the higher the content of virgin fibres, the stronger and stiffer (higher compression resistance) the fluting or linerboard material will be. The fluting material that has been explored for the purpose of this invention is a semi-chemical fluting made of 100% virgin fibres made of hardwood, such as birch, from Powerflute. Birch is an optimal fluting raw material. Its structure contains high concentrations of lignin and hemicellulose. The pulping process preserves the naturally highly hydrophobic lignin and modifies the remaining hemicellulose so that the soft and flexible cellulose core of the fibre is protected. This provides higher stiffness and lower creep properties. When used for liquid packaging, fluting materials available on the market need to be complemented with one or more additional sizing agent during the cellulose web manufacturing, in order to cope with the liquid and high-moisture conditions for this new use and application. Conventional sizing technologies and chemicals (AKD, ASA, rosin, etc.) can be used for the fluting material in order to meet the necessary requirements for the specific product.

Linerboard made of virgin fibres, is called kraft liner, whereas linerboard from recycled fibres is known as testliner. Also mixes of virgin and recycled fibres are possible. Kraft linerboard should have at least 80 wt %, and preferably 100 wt % of virgin fibres. The fibres used for linerboard are longer than those used in fluting material, and since linerboard is originally intended for the outer, liner layers of a carton material, they are also sized with sizing agents in order to withstand different degrees of moisture and wet conditions.

It has been seen that linerboard material appears to be working even better as a spacer layer in liquid carton laminates, since it generally has higher higher elongation at break than fluting, and contains less impurities like splinters and fibre clusters. Both these properties are advantageous in laminated packaging materials intended for fold forming into packages. Regarding moisture resistance, linerboard is also better thanks to a lower content of hemicelluloses, which are sensitive to moisture.

Containerboard materials thus have lower bending stiffness than corresponding paperboards for liquid packaging, but have, on the other hand, a higher SCT index, i.e. a higher SCT value per grammage unit in the machine direction (MD), than a normal liquid paperboard material, or than other paper or cellulose materials that would be suitable in this context. Containerboard in general have a bending stiffness which is at least 30% lower than the bending stiffness of a liquid paperboard, which has a corresponding grammage, when excluding the printable coating (clay-coat) grammage. Generally, fluting materials have a higher bending stiffness per grammage than linerboard materials.

The SCT value is a property measured by the international standard ISO9895, and which is relied on to compare different containerboard materials with each other. The SCT or Short Compression Test measures the internal compression resistance of paper fibres, i.e. the in-plane compression strength of a paper, in CD and MD. This property varies with the grammage of the specific paper measured on. Grammage of paper products is measured according to ISO 536.

Packages made from a material having a higher SCT index, have better stackability, and it is thus a measurement of compression strength per grammage in the in-plane (x-y plane) of a carton material. Containerboard materials normally have an SCT index of at least 30 Nm/g in MD, and would thus provide i.a. the required compression strength and stackability properties for a liquid paperboard laminate. These materials do not need to be optimised regarding bending stiffness properties, since they will only be used as (non-fluted) spacer layers in laminated materials for liquid carton packaging. Thus, whereas such linerboard materials originally are intended for facing layers in a corrugated carton sandwich structure, they will for the purpose of the present invention be used as the spacer layer in a laminated structure, having further facing layers laminated on each side thereof, in order to provide the required bending stiffness properties for liquid carton laminated materials.

For comparison, today's liquid paperboard materials have an SCT index of about 25 Nm/g, but are then also optimised regarding all other properties, since they are relied on as the main provider of dimensional stability in liquid carton laminated packaging materials. When replacing today's optimised liquid paperboard with a low-cost spacer layer in a sandwich structure in a laminate, such a spacer layer needs to have a higher SCT index, of at least 30 Nm/g, in order to compensate for the loss of properties when removing the state-of-the-art paperboard.

Since the new spacer layer will be laminated to further facing layers in a sandwich configuration in a laminate structure, there is no need to provide a white or smooth (e.g. clay-coated) printing surface on the spacer layer itself. Also in that respect, the container board materials are thus suitable materials for such a spacer layer.

Regarding moisture resistance, these materials may have a Cobb water adsorption value of lower than 35 g/m2, in order to function better in a liquid carton packaging laminate. The Cobb value is measured according to ISO 535, and is fulfilled by most linerboard materials already, while some fluting materials may need additional sizing in order to be used as a non-fluted spacer layer in a liquid carton packaging laminate. Accordingly, a containerboard material in a bulk layer, comprises at least one sizing additive. When down-gauging from conventional liquid paperboard to cellulose-based containerboard materials, such as fluting materials or linerboard materials, for the bulk layer, it has been seen that an aluminium foil barrier laminated to the inside of the bulk layer, gets fine cracks and is not tight towards gas permeation any longer. This is thus a consequence of inadequate mechanical performance in several aspects of such a low-cost and low-rate bulk material, resulting in more strain and stress on the aluminium foil to the limit where it actually cracks and breaks.

Suitable stabilizing paper facing layers for an outside print substrate layer may be found among thin Kraft papers, greaseproof papers or parchment papers. They should have a grammage from 20 to 100 $g/m^2$, such as from 30 to 70 $g/m^2$, such as from 30 to 60 $g/m^2$ and a density from 600 to 1500 $kg/m^3$.

Typically, a paper facing layer for the purpose of the invention, should have a Young's modulus from 1 to 10 GPa, such as from 5 to 10 GPa (in comparison to aluminium-foil of about 6 μm thickness, which has from 30 to 70 GPa).

The bending stiffness of a packaging material laminate may be derived from the thicknesses and the Young's moduli of the individual layers. For balancing mechanical properties of a sandwich laminated material structure, the facing layers of the sandwich should be arranged on each, respective, side of the spacer layer, such that they have substantially equal extensional stiffness. The extensional stiffness is given by the product of Young's modulus and thickness.

A well functioning paper facing layer also for the outside of the packaging laminate, may be a greaseproof paper or high-density paper also having a smoothened and pre-coated surface for subsequent barrier coating, in particular vapour deposition barrier coating. Of course, such a paper facing layer would then contribute further to the oxygen barrier of the final packaging laminate.

According to a further aspect of the laminated packaging materials obtained, the outermost heat sealable layers of the laminated material may be provided as one or two pre-manufactured films. Thus, such a film may be pre-laminated to the barrier layer, in a first pre-laminate material to be laminated to the first side of the bulk layer, and/or pre-laminated to a printed and decorated outside surface layer to be laminated to the second side of the bulk layer. When films are pre-laminated to barrier layers or printed, decorated layers, it may be by mere heat-pressure lamination of the films to the other layers, especially if a pre-coated or integrated layer of an adhesive polymer such as EAA or EMAA is present or applied on one of the lamination surfaces. Alternatively, lamination may be made by means of melt extrusion lamination, which is more expensive due to the higher consumption of interjacent melt extrusion polymer, or by pre-coating with a small amount of an aqueous adhesive that may penetrate into the at least one paper or cellulose-based surface to be laminated, without any drying step needed.

Within the general quest of lowering costs of laminated packaging materials, it is desired to combine properties in the various layers such that as few as possible additional layers are needed.

When the conventional liquid packaging paperboard of today's packaging laminate is replaced by weaker bulk layers, enabling significant cost savings, some additional costs may instead be spent on various tailor-made décor substrates for printing and decorating the laminated packaging material. Since the bulk layer of the invention will no longer constitute a print-surface, i.e. a surface to be printed, the smooth white surface and expensive clay-coat may be omitted from the bulk layer, and a smooth and white print surface may be obtained by other means, instead on the outside print substrate facing paper, to be laminated to the outer side of the bulk layer. Such a print substrate may for example be a coloured film or a white printable paper facing layer. Alternatively, a white paper for providing the white print background surface may be pre-laminated to a transparent film, which is printed before laminating on its back-side, i.e. a reverse printed film, such that the printed décor is directed towards the white paper surface and protected by the transparent film substrate. Thus, the printing and the lamination to an outside white, paper facing layer and possibly the further lamination to outermost heat sealable layers may take place in a prior lamination operation in order to provide the second pre-laminated material for the second side, the outside, of the laminated packaging material.

In order to further provide light barrier properties and whiteness, such a film or paper may comprise white filler material or in the case of paper a clay-coat, also or instead, a metallized layer. For some products and appearances of the packaging containers, a metallized print surface is preferred, and in other cases a coloured print surface or a brown, natural cellulose print surface. By detaching the print surface layer from the bulk layer, versatility in possible outside appearances becomes possible and this is a further advantage of the three-part modular lamination model of this invention. Even further oxygen barrier layers may be included in the second pre-laminated material in order to enhance the total barrier performance of the final laminated material.

EXAMPLES AND DESCRIPTION OF DRAWINGS

Figure 1B:
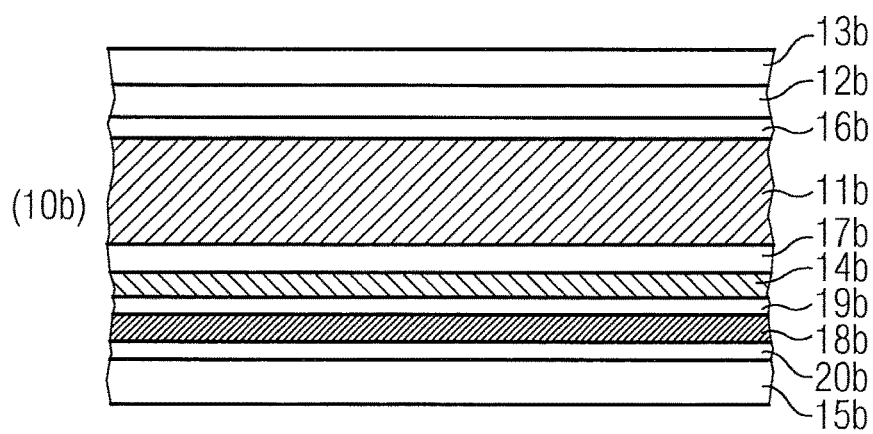
Figure 1C:
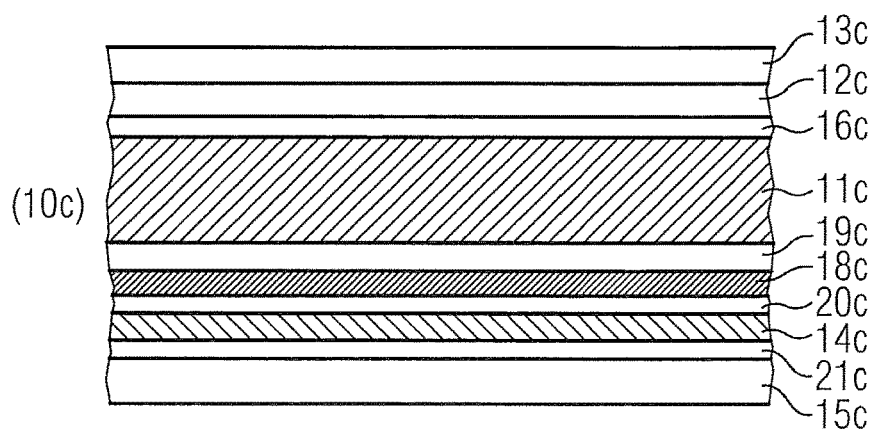
Figure 2A:
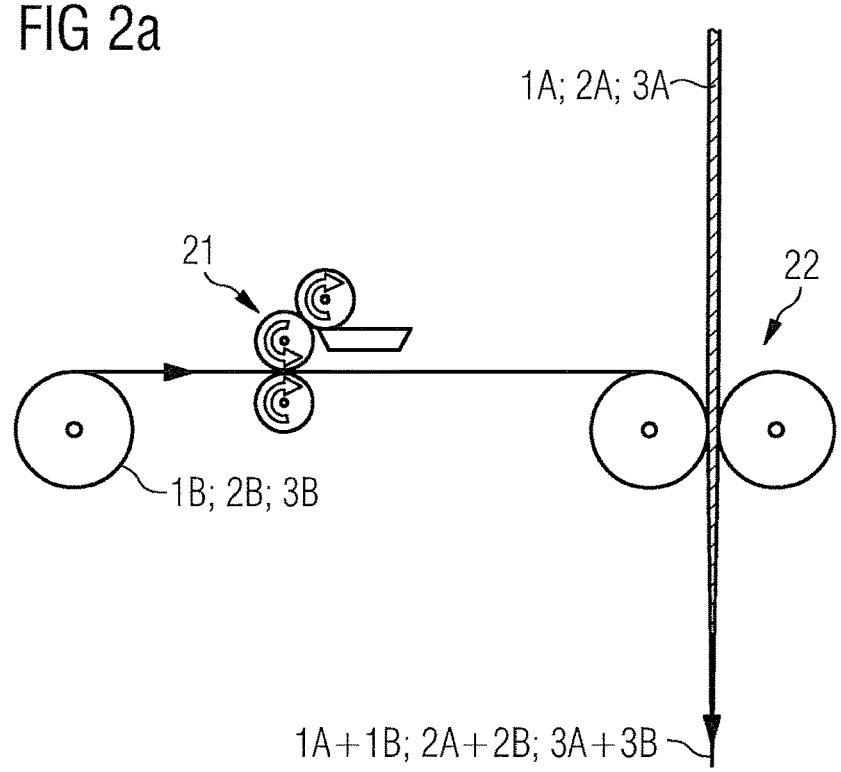
Figure 2B:
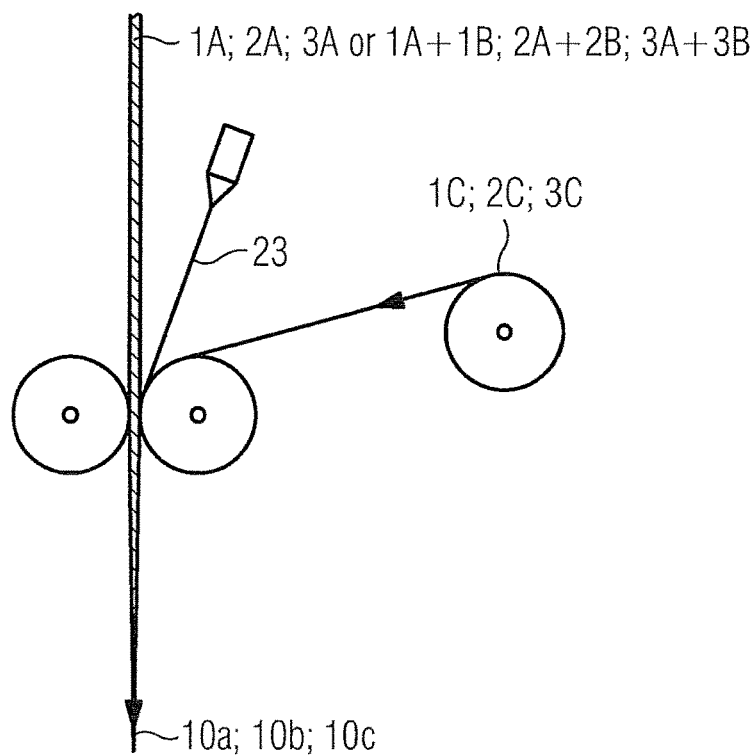
Figure 3A:
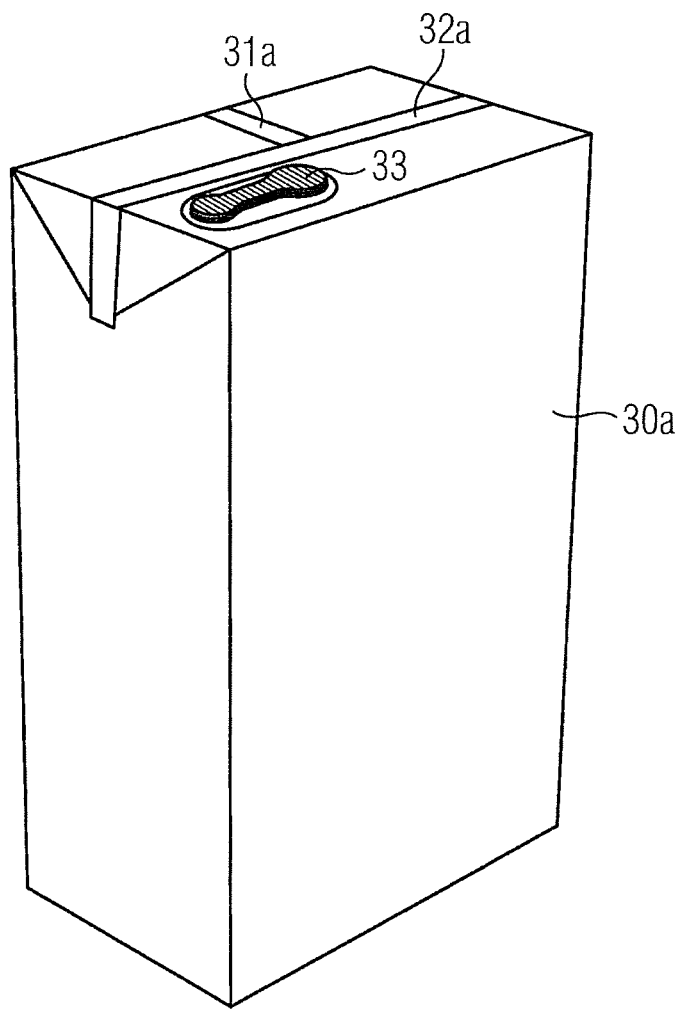
Figure 3B:
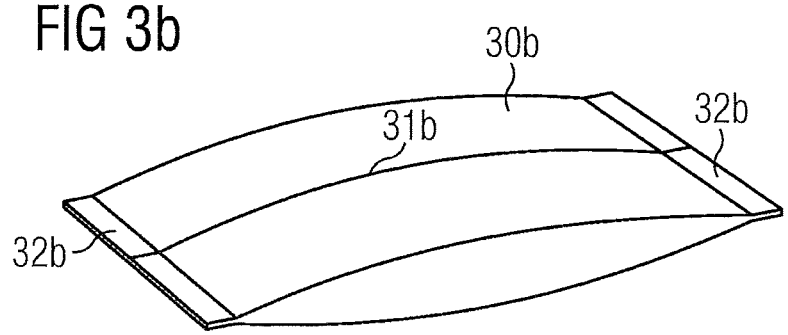
Figure 3C:
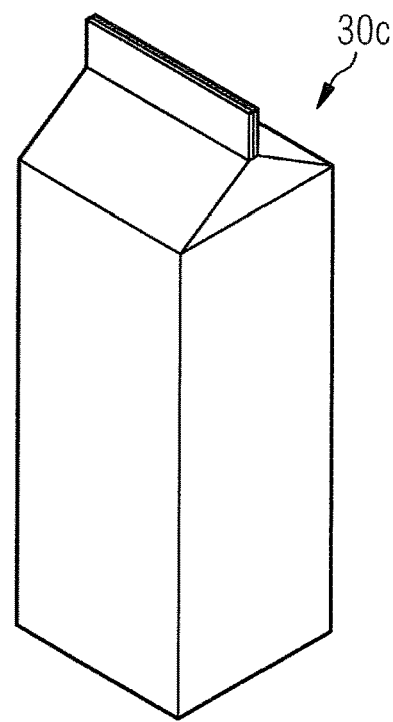
Figure 3D:
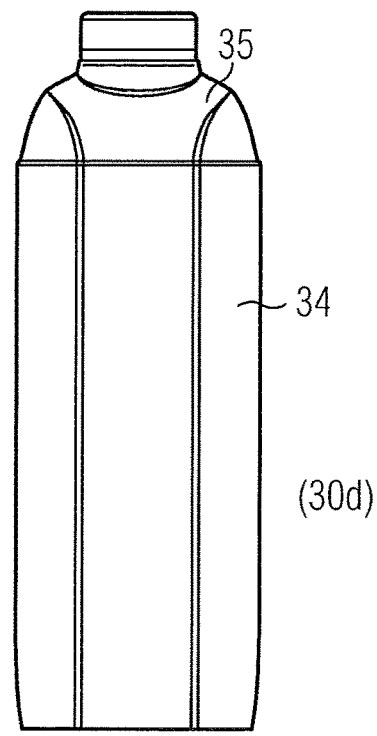
Figure 4:
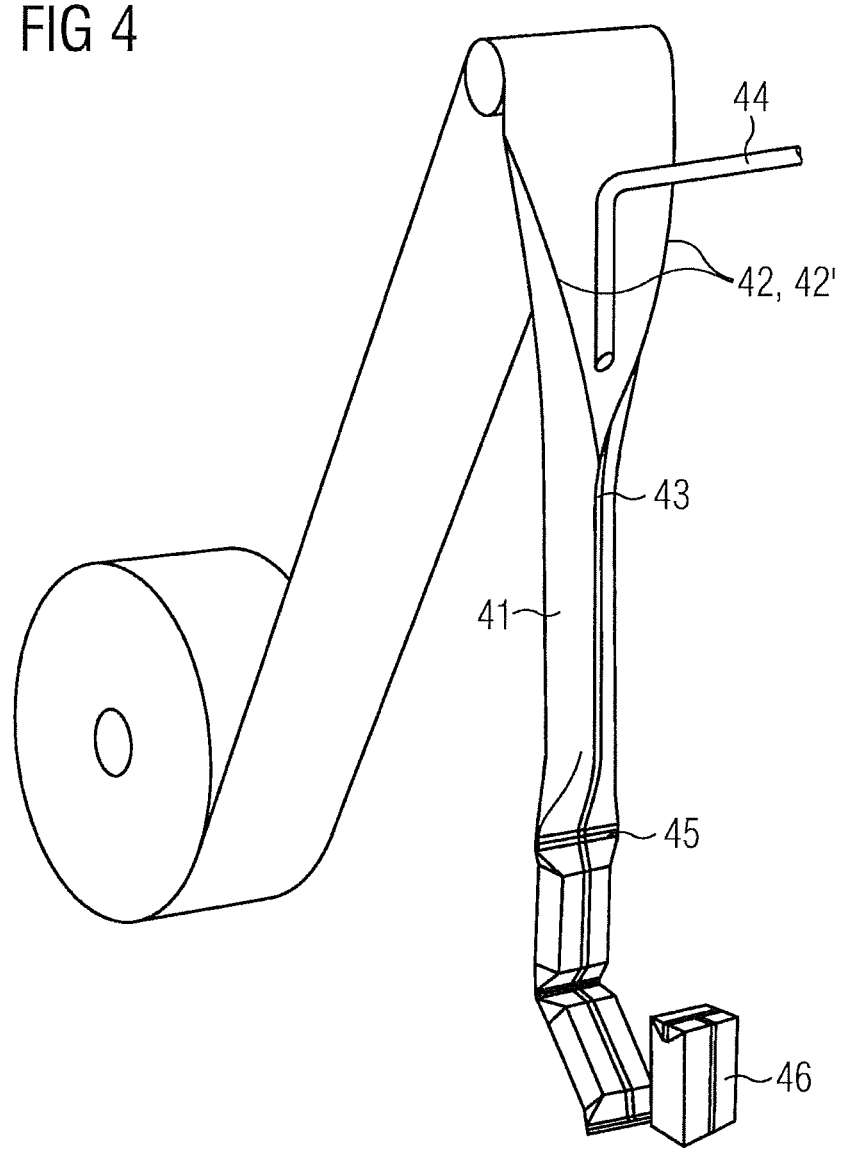
Figure 5:
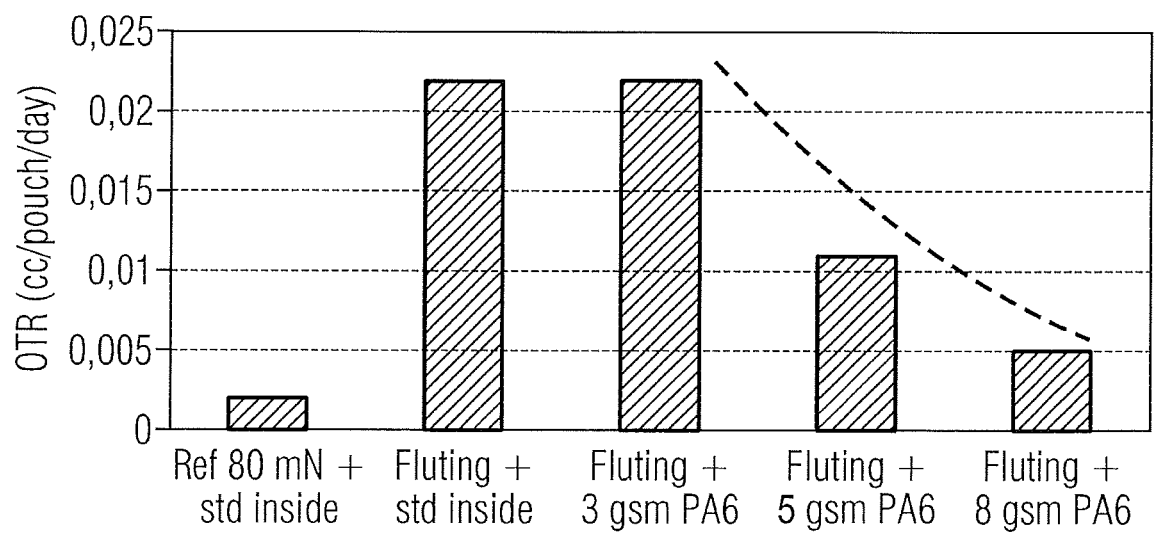

In the following, embodiments of the invention will be described with reference to the drawings, of which:

FIG. 1a is showing a schematic, cross-sectional view of a laminated packaging material which has a bulk layer from a fluting material and an aluminium foil barrier according to the invention, FIG. 1b shows a schematic, cross-sectional view of a further embodiment of a laminated packaging material of a bulk layer from a fluting material and an aluminium foil barrier, FIG. 1c shows a schematic, cross-sectional view of yet a further embodiment of such a laminated packaging material, FIG. 2a shows schematically an example of a method, for laminating the aluminium foil barrier to the bulk material in accordance with the invention, FIG. 2b shows schematically an example of a different method, for laminating the aluminium foil barrier to the bulk material, in accordance with the invention, FIGS. 3a, 3b, 3c, 3d show typical examples of packaging containers produced from the laminated packaging material according to the invention, FIG. 4 shows the principle of how packaging containers may be manufactured from the packaging laminate in a continuous, roll-fed, form, fill and seal process, FIG. 5 is a diagram showing how the oxygen barrier properties of a laminated packaging material from a bulk layer made of fluting material is deteriorated in comparison to a conventional paperboard-based laminated liquid packaging material, when laminated with an aluminium foil barrier in the same way and formed into filled pouch packages of the same kind, as well as how it may be improved again by laminating to a further layer of polyamide on the inside of the bulk layer.

In FIG. 1a, there is thus shown, in cross-section, a first embodiment of a laminated packaging material, 10a, of the invention. It comprises a bulk layer 11a of a fluting material, having a grammage from 100 to 300 g/m$^2$, such as herein used 200 g/m$^2$.

On the inside, of the spacer layer 11a, the laminated material comprises an aluminium foil barrier interacting in a sandwich structure with the bulk layer 11a and a thin, high-density paper print substrate, 12a also acting an outside paper facing layer. The aluminium foil has a thickness from 5 to 9 µm, such as 6 to 7 µm. On the inside of the aluminium foil barrier, there is also provided a further barrier layer of a polyamide 18a. The polyamide barrier layer is bonded to the aluminium foil barrier by means of an adhesive polymer, being an ethylene acrylic acid copolymer EAA, having an acrylic monomer content of from 1.5 to 10 mole-%. The polyamide barrier layer may be applied at an amount from 3 to 12 g/m$^2$, such as from 3 to 10 g/m$^2$ such as from 3 to 8 g/m$^2$, such as from 3 to 6 g/m$^2$, depending on requirements of the food product to filled and the balance with costs of the materials used.

According to a preferred embodiment, the polyamide barrier layer comprises an aromatic or semi-aromatic polyamide polymer. However, the most common polyamide suitable for the purpose of cost efficient laminated packaging materials and easy manufacturing of such coextrusion coated laminate structures is PA-6.

The inside also comprises an innermost, heat sealable thermoplastic layer 15a, which is also the layer of the packaging laminate that will be in direct contact with the filled food product in a final packaging container. The innermost, heat sealable polymer layer 15a is melt co-extrusion coated together with the polyamide barrier layer and intermediate tie layers of EAA 19a and 20a, onto the aluminium foil 14a.

The (co-)extrusion coating of the innermost layer 15a, the polyamide barrier layer 18a and intermediate tie layers may be done before or after lamination of the aluminium foil barrier to the bulk layer 11a.

The innermost heat sealable layer or multilayer 15a may alternatively be applied in the form of a pre-manufactured film, adding further stability and durability by being an oriented film to a higher degree than what is obtainable in extrusion coating operations. Such a film is then melt co-extrusion laminated to the aluminium foil by the intermediate polyamide barrier layer 18a and the tie layers 19a and 20a. Again, the inside material layers may be pre-laminated as a separate module inside, before laminating it to the bulk layer 11a. In this particular embodiment, however, aluminium foil is first laminated to the bulk layer 11a, or the other parts of the laminated material including the bulk layer, and subsequently melt extrusion laminated on the inner side of the aluminium foil with the polyamide barrier layer 18a and the layer or multilayer 15a of a heat sealable polymer being selected from polyolefins, such as polyethylenes, such as in this case a low density polyethylene composition comprising a blend of a metallocene-catalysed linear low density polyethylene (m-LLDPE) and a low density polyethylene (LDPE). If two layers are constituting the heat sealable layer, there may be a first layer of LDPE and a second innermost layer of the above blend.

On the other side, the outside of the spacer material layer 11a, the packaging material comprises a print substrate layer of a thin, high-density paper 12a, with a grammage of 70 g/m$^2$ and having a smooth print surface. If a white print substrate is desired, the thin paper facing layer may be provided with a clay-coat or the like. The paper 12a also constitutes a facing layer on the outside of a sandwich structure in interaction with the spacer layer 11a and the aluminium foil barrier on the inside of the bulk layer. In the final laminated material, the substrate 12a is printed and decorated with a print pattern from various colours, images and text. The material outside of the bulk layer also comprises an outermost liquid-tight and transparent layer 13a of a plastic, preferably a heat sealable thermoplastic, such as a polyolefin, such as a polyethylene material layer. The print substrate and paper facing layer 12a may be printed before or after lamination to the bulk layer, and the outermost plastic layer 13a be applied onto the printed substrate layer in a separate operation before or after lamination to the bulk layer 11a. If coating of the décor print with the plastic layer 13a takes place before lamination to the bulk layer, the whole outside material is thus prepared as one module, i.e. as a pre-laminated outside, which is then laminated to the bulk layer or to the rest of the laminate, on the outside of the bulk layer.

The thin, high-density print substrate also being a paper facing layer 12a on the outside of the bulk and spacer layer 11a may be a paper with a grammage from 20 to 100, such as from 30 to 80, such as from 30 to 60 g/m$^2$, and having a density from 600 to 1500 kg/m$^3$. In particular embodiments, it may be a greaseproof paper, alone or coated with a further barrier coating, such as for example a metallization coating. Some greaseproof papers provide a further gas barrier of lower than 2 cc/m$^2$/day/atm at 23° C. and 50% RH, when laminated between thermoplastic layers, such as polyethylene layers or the like, the outermost polymer layer 13a being one such adjacent thermoplastic polymer layer.

The operation of laminating the aluminium foil to the bulk layer may be a melt extrusion lamination operation, thus applying an intermediate thermoplastic bonding layer 17a between the bulk layer and aluminium foil.

In this particular embodiment, however, the lamination of the aluminium foil barrier layer 14a to the bulk layer 11a is carried out by applying a low amount of an aqueous solution of an adhesive that is partly absorbed into the bulk cellulose layer and efficiently adheres the two layers together, the adhesive being an aqueous dispersion of an acrylic-modified copolymer with ethylene at a solid content from 30 to 50 weight %. The acrylic functionality creates a good bond to the aluminium foil surface and thus provides good adhesion between the two laminated layers.

The lamination of the print substrate paper facing layer 12a to the bulk layer 11a is also carried out by applying a low amount of an aqueous solution of an adhesive that is partly absorbed into the respective cellulose layers and efficiently adheres the two paper-cellulose layers together, the adhesive instead being starch or nano-/micro-fibrillar cellulose or polyvinyl alcohol/polyvinyl acetate or similar hydrophilic substances, which readily bond to cellulose molecules. When the adhesive material has inherent barrier properties, of course such an adhesive, although applied by a very low amount, may contribute even further to the resulting oxygen barrier properties of the laminated packaging material.

Alternatively, but less preferred from an environmental and cost savings point of view, the outside print substrate layer 12a may be laminated to the bulk layer 11a by means of melt extrusion lamination with a thermoplastic bonding polymer such as LDPE or the like.

In FIG. 1b, a similar cross-section, of a second embodiment of a laminated packaging material, 10b, is shown. The laminated material is substantially the same as the material in FIG. 1a, except from the print substrate layer 12b being a polymer film. The bulk layer 11b is laminated to the print substrate film by an intermediate adhesive 16b. The innermost heat sealable layer 13b is the same or similar to 13a in the packaging material 10a. The print substrate may be a coloured, transparent or metallized as a few examples of various print backgrounds possible, depending on taste and choice of independent customers and consumers. Suitable thicknesses of such print substrate films may be from 10 to 40 µm.

FIG. 1c shows a cross-section, of a third embodiment of a laminated packaging material according to the invention, 10c. The laminated packaging material is in principle the same as that described in FIGS. 1a and 1b, however with the polyamide barrier layer 18c instead located between the aluminium foil barrier 14c and the bulk layer 11c. The aluminium foil barrier layer is thus melt co-extrusion laminated with the bulk layer by means of the polyamide barrier material being melt coextruded together with surrounding, adjacent tie layers 19c and 20c. The innermost heat sealable layer 15c is melt coextrusion coated onto the aluminium foil barrier together with a tie layer of EAA having an acrylic acid content from 1.5 to 10 mol-%, as the adhesion contact layer to the aluminium foil.

In FIG. 2a it is schematically illustrated how one layer or module of layers may be laminated to another layer/module by cold aqueous adhesive absorption lamination, such that a very low amount of an aqueous adhesive solution is applied onto one of the surfaces to be laminated to each other, the aqueous adhesive solution then being absorbed into one or both of the two surfaces while adhering them together under the application of pressure. Thus, in the embodiments for manufacturing the laminated packaging materials in FIGS. 1a-1c, an aqueous adhesive solution is applied onto the surface to be laminated, of the outside layer/material module 1B;2B;3B representing the layer(s) on the outside of the bulk layer (11a;11b;11c), i.e. onto the non-print surface of the print substrate layer 12a;12b;12c, in an adhesive application operation 21. At a lamination nip between two nip rollers, a web of the center module material 1A;2A;3A representing the bulk layer comprising a spacer layer, is laminated at lamination station 22 to a web of the outside module material 1B;2B;3B under simultaneous forwarding of the two webs through the lamination nip, at a pressure sufficiently high for adhereing the two surfaces together, but not so high that a low density bulk layer or the spacer layer of a sandwich structure is collapsed. The obtained web of the intermediate pre-laminate of two layers/modules 1A+1B; 2A+2B;3A+3B is forwarded to a further lamination station for lamination to the third module or parts of it as will be described herein below in FIG. 2b, or alternatively wound up onto a reel for intermediate storage or transport to a different time or place, where the final lamination and finishing steps will take place. The cold aqueous adhesive absorption lamination method may also or alternatively be applied when laminating the inside material module 1C;2C; 3C to the center layer/module material or pre-laminated center and outside modules.

In FIG. 2b it is schematically illustrated how one layer/ module may be laminated to another layer/module by melt extrusion lamination such that the two surfaces to be laminated are bonded to each other by an intermediate thermoplastic bonding layer. According to this example, the web of the pre-laminate of the two modules laminated in the example of FIG. 2a is forwarded to a lamination nip at the same time as a web of the inside material module 1C;2C;3C. At the same time, a molten curtain of a thermoplastic bonding polymer 23;17a;17b;17c is extruded down into the lamination roller nip, and being cooled while pressing the two webs together, such that sufficient adhesion is obtained between the cellulose-based center module, i.e. the surface of the bulk layer 11a;11b;11c and the aluminium foil barrier 14a; 14b;14c of the inside material module.

FIG. 3a shows an embodiment of a packaging container 30a produced from the packaging laminate 10a;10b;10c according to the invention. The packaging container is particularly suitable for beverages, sauces, soups or the like. Typically, such a package has a volume from about 100 to 1000 ml. It may be of any configuration, but is preferably brick-shaped, having longitudinal and transversal seals 31a and 32a, respectively, and optionally an opening device 33. In another embodiment, not shown, the packaging container may be shaped as a wedge. In order to obtain such a "wedge-shape", only the bottom part of the package is fold formed such that the transversal heat seal of the bottom is hidden under the triangular corner flaps, which are folded and sealed against the bottom of the package. The top section transversal seal is left unfolded. In this way the half-folded packaging container is still is easy to handle and dimensionally stable when put on a shelf in the food store or on a table or the like.

FIG. 3b shows an alternative, preferred example of a packaging container 30b produced from an alternative packaging laminate according to the invention. The alternative packaging laminate is thinner by having a thinner cellulose bulk layer 11, and thus it is not dimensionally stable enough to form a cuboid, parallellepipedic or wedge-shaped packaging container, and is not fold formed after transversal sealing 32b. It will thus remain a pillow-shaped pouch-like container and be distributed and sold in this form.

FIG. 3c shows a gable top package 30c, which is fold-formed from a pre-cut sheet or blank, from the laminated packaging material comprising a bulk layer of paperboard and the durable barrier film of the invention. Also flat top packages may be formed from similar blanks of material.

FIG. 3d shows a bottle-like package 30d, which is a combination of a sleeve 34 formed from a pre-cut blanks of the laminated packaging material of the invention, and a top 35, which is formed by injection moulding plastics in combination with an opening device such as a screw cork or the like. This type of packages are for example marketed under the trade names of Tetra Top® and Tetra Evero®. Those particular packages are formed by attaching the moulded top 35 with an opening device attached in a closed position, to a tubular sleeve 34 of the laminated packaging material, sterilizing the thus formed bottle-top capsule, filling it with the food product and finally fold-forming the bottom of the package and sealing it.

FIG. 4 shows the principle as described in the introduction of the present application, i.e. a web of packaging material is formed into a tube 41 by the longitudinal edges 42 of the web being united to one another in an overlap joint 43. The tube is filled 44 with the intended liquid food product and is divided into individual packages by repeated transversal seals 45 of the tube at a pre-determined distance from one another below the level of the filled contents in the tube. The packages 46 are separated by incisions in the transversal seals and are given the desired geometric configuration by fold formation along prepared crease lines in the material.

In FIG. 5 it is shown how the oxygen barrier of a laminated packaging material from a bulk layer of cellulose fluting material is deteriorated in comparison to a reference conventional paperboard-based laminated liquid packaging material, when laminated with an aluminium foil barrier in the same way and formed into filled 1-litre folded pouch packages of the same kind. It has been confirmed that there were numerous cracks in the aluminium foil, when laminated to the fluting layer and formed into packages, and this was identified as the reason for loss of oxygen barrier. This shows that when selecting low-cost cellulose-based spacer layers, thus altering the mechanical properties of the bulk layer, the oxygen barrier properties are as a consequence deteriorated and there is a need to increase or improve or replace the existing barrier materials.

Reference laminate: //LDPE/80 mN paperboard/LDPE/al-foil 6 µm/EAA/blend LDPE+mLLDPE/

EXAMPLE 1

//LDPE/200 g/m² fluting material/LDPE/al-foil 6 µm/EAA/blend LDPE+mLLDPE/

EXAMPLES 2, 3, 4

//LDPE/200 g/m² fluting material/LDPE/al-foil 6 µm/EAA/PA-6 (3,5, and 8 g/m²)/ blend LDPE+mLLDPE/

As seen in the diagram, the OTR decreases with increasing grammage of PA-6, while the barrier towards free fatty acid substances migration should correspondingly increase. By controlling the amount of applied polyamide in the laminate, the desired oxygen barrier may be obtained, for a specific food product to be packed.

FURTHER EXAMPLE

Packaging laminates according to FIG. 1b were produced having a white paper print substrate on the outside of the laminate. The laminates were produced having a white paper print substrate on the outside of the laminate and laminated to a fluting material bulk layer. On the other side of the fluting material bulk layer, the following different structures were applied;

| Sample ID | No. tested packages | No. conductivity readings |
| --- | --- | --- |
| A1 | — | More than 10 leaks* |
| A2 | 300 | 0 |
| B1 | — | More than 10 leaks* |
| B2 | 300 | 2 |
| Reference | 300 | 1 |

A1: (LDPE/Alu-foil/EAA/mPE)
A2: (LDPE/Alu-foil/EAA/PA/EAA/mPE
B1: (thin layer EAA/Alu-foil/EAA/mPE)
B2: (thin layer EAA/Alu-foil/EAA/PA/EAA/mPE
*Conductivity not tested due to high frequency of visible leaks
The conductivity test is an inhouse standard procedure in order to detect leakages.

The invention is not limited by the embodiments shown and described above, but may be varied within the scope of the claims. As a general remark, the proportions between thicknesses of layers, distances between layers and the size of other features and their relative size in comparison with each other, should not be taken to be as shown in the figures, which are merely illustrating the order and type of layers in relation to each other all other features to be understood as described in the text specification.

The invention claimed is:

1. Laminated cellulose-based, liquid- or viscous-food packaging material, for heat sealing into aseptic packaging containers containing a packaged food product, comprising a bulk material layer comprising a cellulose-based linerboard material having a Short Compression Test Index value, of at least 30 Nm/g in the machine direction (MD), as determined in accordance with ISO 9895 and ISO 536, and a bending stiffness at least 30% lower than a bending stiffness of a liquid carton paperboard having a corresponding grammage, when excluding grammage of a printable coating, the laminated packaging material further comprising a separate print substrate layer arranged on an outside of the bulk material layer to be directed outwards from a packaging container made from the laminated packaging material, and an outermost, transparent, protective polymer layer on an outside of the print substrate layer, the separate print substrate layer being a paper having a paper or metallization print background surface and a grammage from 20 g/m² to 100 g/m², the laminated packaging material further comprising an innermost, heat-sealable and liquid-tight layer of a thermoplastic polymer to be in direct contact with the packaged food product when the laminated packaging material is heat-sealed into the aseptic packaging containers containing the packaged food product, a barrier metal foil or a barrier-coated film laminated between the bulk layer and the innermost heat-sealable and liquid-tight layer of the thermoplastic polymer and a further barrier layer comprising at least 50 wt-% of a polyamide, also arranged between the bulk layer and the innermost heat-sealable and liquid-tight layer of the thermoplastic polymer.

2. Laminated packaging material as claimed in claim 1, wherein the further barrier layer comprising at least 50 wt-% of a polyamide is arranged between the barrier metal foil or barrier-coated film and the innermost heat-sealable and liquid-tight layer of the thermoplastic polymer.

3. Laminated packaging material as claimed in claim 1, wherein the further barrier layer comprises a polyamide in a blend with a polymer selected from the group consisting of ethylene vinyl alcohol (EVOH) and polyethyleneterephthalate (PET).

4. Laminated packaging material as claimed in claim 1, wherein the polyamide comprises an aromatic or semi-aromatic polyamide.

5. Laminated packaging material as claimed in claim 1, wherein the further barrier layer is applied at an amount from 3 to 12 g/m².

6. Laminated packaging material as claim 1, wherein the bulk material layer has a grammage from 100 to 300 g/m².

7. Laminated packaging material as claimed in claim 1, wherein the bulk material layer comprises semi-chemical fluting material made of 100% primary fibres made of birch.

8. Laminated packaging material as claimed in claim 1, wherein the barrier metal foil or a barrier-coated film is laminated to the bulk layer by a bonding adhesive of an acrylic-modified polyethylene copolymer, applied at an amount from 0.5 to 3 g/m², dry content.

9. Laminated packaging material as claimed in claim 1, wherein the print substrate layer is a paper having a grammage from 30 g/m² to 70 g/m².

10. Laminated packaging material as claimed in claim 1, wherein the laminated packaging material further comprises a colour or metallised print background surface disposed on the print substrate layer.

11. Liquid- or viscous-food packaging container comprising the laminated packaging material as defined in claim 1.

12. Method for manufacturing the laminated cellulose-based, liquid- or viscous-food packaging material as defined in claim 1, comprising, in any order,
   a) laminating a barrier metal foil or barrier-coated film to a bulk material layer comprising a cellulose-based linerboard material having a short compression test index value, of at least 30 Nm/g in the machine direction (MD), as determined in accordance with ISO 9895 and ISO 536,
   b) applying a further barrier layer comprising at least 50 weight % of polyamide on the other, non-laminated side of the barrier metal foil or barrier-coated film,
   c) applying the innermost heat sealable thermoplastic polymer layer on the non-laminated (in)side of the further polyamide barrier layer,
   d) applying further layers, including a print substrate layer, with or without a printed décor pattern, to the other, outer side of the bulk material layer.

13. Method as claimed in claim 12, wherein the barrier metal foil or barrier-coated film is laminated to the bulk material layer by applying an aqueous adhesive composition onto one of the surfaces to be laminated and allow absorption of the adhesive composition into the cellulose surface of the bulk layer, while pressing the layers to adhere to each other by letting them pass through at least one lamination roller nip and without any drying operation or step being performed.

14. Method as claimed in claim 12, wherein the further barrier layer is melt co-extrusion coated together with the innermost heat sealable layer onto the barrier metal foil or barrier-coated film in one step b-c).

\* \* \* \* \*